United States Patent
Gafri et al.

(10) Patent No.: US 7,256,373 B2
(45) Date of Patent: Aug. 14, 2007

(54) APPARATUS AND METHOD FOR MANUFACTURE OF A DRIVESHAFT BY A PULSED MAGNETIC FORCE PROCESS

(75) Inventors: Oren Gafri, Rishon Le-Zion (IL); Yuri Livshiz, Rishon Le-Zion (IL)

(73) Assignee: Pulsar Welding Ltd., Yavne (IL)

( * ) Notice: Subject to any disclaimer, the term of this patent is extended or adjusted under 35 U.S.C. 154(b) by 0 days.

(21) Appl. No.: 11/459,940

(22) Filed: Jul. 26, 2006

(65) Prior Publication Data

US 2006/0289479 A1  Dec. 28, 2006

Related U.S. Application Data

(63) Continuation-in-part of application No. PCT/IL2005/000087, filed on Jan. 25, 2005.

(60) Provisional application No. 60/538,500, filed on Jan. 26, 2004.

(51) Int. Cl.
*H05B 6/10* (2006.01)
*B21D 26/14* (2006.01)

(52) U.S. Cl. ............... 219/603; 219/611; 219/617; 29/419.2; 29/518; 72/56

(58) Field of Classification Search .......... 219/603, 219/611, 607–608, 617, 670, 672–676; 29/419.2, 29/432, 432.1, 505, 432.2, 518–519; 72/56; 228/107

See application file for complete search history.

(56) References Cited

U.S. PATENT DOCUMENTS

| 3,654,787 | A | * | 4/1972 | Brower ..................... 72/56 |
| 3,961,739 | A |   | 6/1976 | Leftheris |
| 4,170,887 | A |   | 10/1979 | Baranov |
| 4,531,393 | A |   | 7/1985 | Weir |
| 4,807,351 | A |   | 2/1989 | Berg et al. |
| 5,353,617 | A |   | 10/1994 | Cherian et al. |
| 5,442,846 | A |   | 8/1995 | Snaper |
| 5,824,998 | A |   | 10/1998 | Livshiz et al. |
| 5,981,921 | A | * | 11/1999 | Yablochnikov ........... 219/603 |
| 2003/0209536 | A1 |   | 11/2003 | Golovashchenko et al. |
| 2003/0226838 | A1 | * | 12/2003 | Gust ..................... 219/617 |

FOREIGN PATENT DOCUMENTS

EP    1 024912    8/2000

* cited by examiner

*Primary Examiner*—Philip H. Leung
(74) *Attorney, Agent, or Firm*—Mark M. Friedman

(57) ABSTRACT

An apparatus (30) and method for forming of a vehicle's driveshaft (32) is provided which makes use of a PMF process. The coil device used in the PMF apparatus is assembled around the shaft from two or more coil sections (40, 41, 43; 42, 44, 45) firmly attached to one another, and which may be disassembled from one another to allow to remove the formed driveshaft (32).

21 Claims, 6 Drawing Sheets

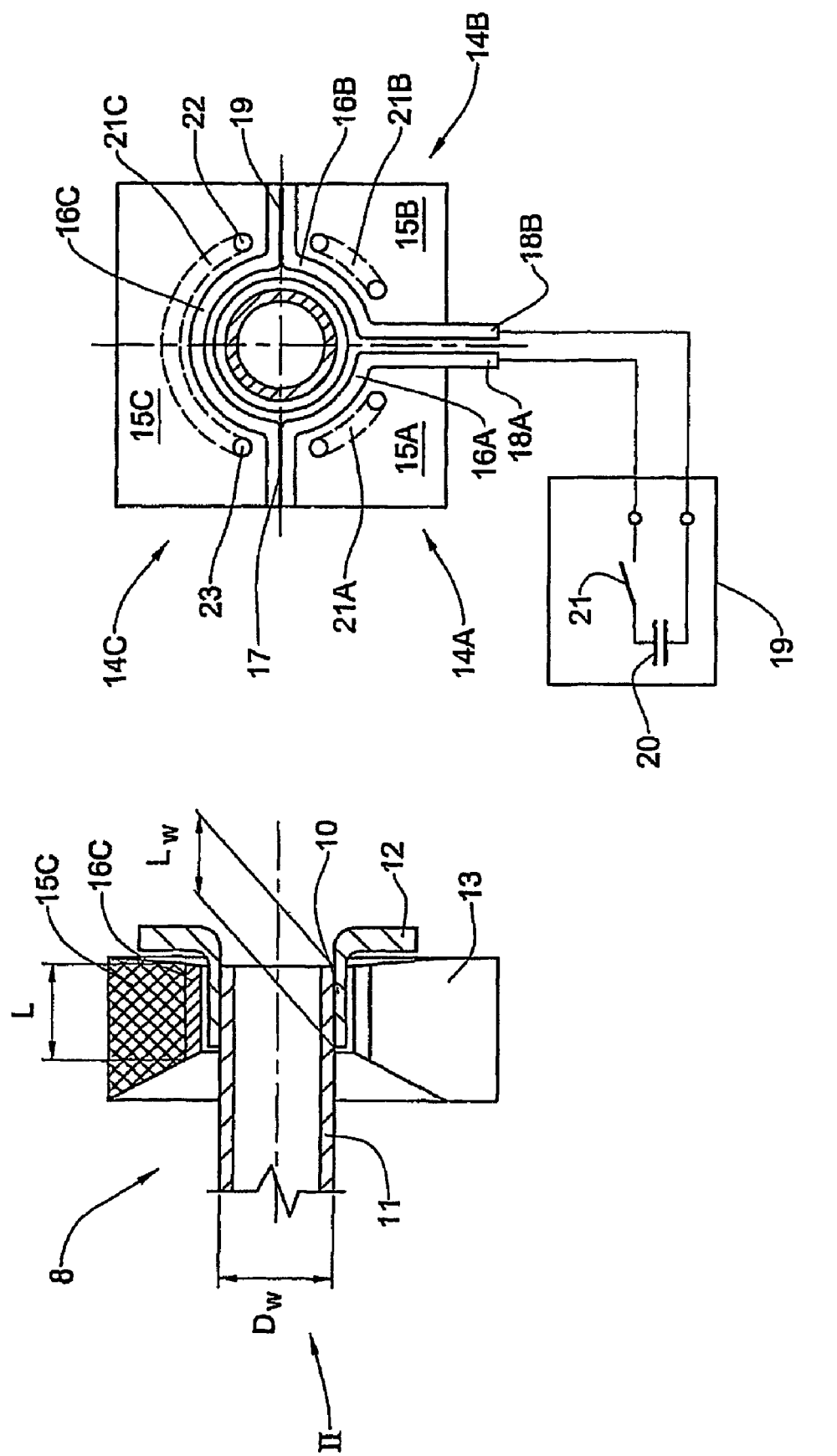

APPARATUS AND METHOD FOR MANUFACTURE OF A DRIVESHAFT BY A PULSED MAGNETIC FORCE PROCESS

This is a Continuation-In-Part of International Patent Application No. PCT/IL2005/000087, filed Jan. 25, 2005, and published as WO 2005/070583, which in turn takes priority from Provisional Patent Application No. 60/538,500 filed Jan. 26, 2004.

FIELD AND BACKGROUND OF THE INVENTION

The invention relates to an apparatus and method for forming of a vehicle's driveshaft having an elongated shaft and two coupling end parts. This is achieved, in accordance with the invention, by a pulsed magnetic force (PMF) process.

A vehicle's driveshaft, having the general structure as outlined above, is commonly manufactured by welding ends of a cylindrical shaft to coupling end parts. Conventional welding is a time consuming and relatively expensive process.

Furthermore, the workpieces are typically heated in this process and therefore at times cooling installations need to be included.

A known way of rapid "cold" joining or welding of workpieces to one another is by the use of a PMF process. By this technology, a very short and intense electric pulse is discharged through a coil and this discharge induces eddy currents in a workpiece which yield magnetic repulsion between the electric coil and the workpiece. This repulsion then deforms the workpiece proximal to the forming coil causing its surface to rapidly move and impinge on another workpiece whereby it either pressure joins, and with higher energy surface welds to the other workpiece.

A particular application of this process is in joining or surface welding of a tubular workpiece onto a cylindrical one contained therein by inducing inward radial deformation of the tubular workpiece. PMF processes and some specific applications thereof are disclosed in the following U.S. Pat. No.: 3,654,787 (Brower), U.S. Pat. No. 3,961,639 (Leftheris), U.S. Pat. No. 4,170,887 (Baranov), U.S. Pat. No. 4,531,393 (Weir), U.S. Pat. No. 4,807,351 (Berg et al.), U.S. Pat. No. 5,353,617 (Cherian et al.), U.S. Pat. No. 5,442,846 (Snaper) and U.S. Pat. No. 5,824,998 (Livshitz et al.).

A specific application of the PMF process for the purpose of joining components for a vehicle's driveshaft is described in U.S. Pat. No. 5,981,921.

There are some specific problems in the realization of the PMF process for forming a driveshaft in that the end pieces radially protrude beyond the circumference of the shaft. In order to utilize the PMF process, the forming coil should be brought into close proximity to the deformed workpiece and in this case this means that the forming coil needs to be closely fitted around the shaft. After joining or surface welding of the shaft and the coupling end part, it is not possible, with the prior art methods, to release the coil turnover and the driveshaft. This is the reason, that the PMF process has not yet found a true application in practice in the field of forming of driveshafts.

SUMMARY OF THE INVENTION

In accordance with the invention an apparatus and method for forming a driveshaft is provided. In accordance with the invention, the above noted problems are overcome by providing an apparatus and utilizing a method in which the forming coil is assembled around the shaft from two or more coil sections which are firmly attached to one another. This forming coil is associated with a current generating unit such that through current discharge from said unit a PMF is produced to cause pressure joining or surface welding of the two driveshaft components.

In the following, the term "joining" will be used to jointly denote both joining of two workpieces, which means bringing their juxtaposed surfaces into very close proximity in a manner so that they pressure impact with one another, as well as surface welding which means in effect a molecular interaction between their juxtaposed surfaces of the two workpieces. In fact, whether joining or welding is achieved in the PMF process depends, to a large extent, on the amount of PMF energy and of the exact working parameters. The artisan will be able to define whether joining or surface welding is required and also to define the exact parameters needed to achieve either joining or welding. For parameters to achieve welding, reference is made to U.S. Pat. No. 5,824,998, which is incorporated herein by reference. As stated, the term "joining" should be construed as referring to either or both of joining and welding.

In accordance with the invention there is provided a novel apparatus and method for forming a driveshaft of the kind having a shaft and two coupling end parts of radial dimensions larger than those of the shaft.

The apparatus comprises one or two forming assemblies for forming one end or two ends of a driveshaft, respectively; the one or two forming assembles comprising each a holder and a forming unit. The holder is a adapted to receive and hold a driveshaft end part pre-assembly which after joining will form the end part of the driveshaft. The pre-assembly consists of two components, of which one is an end section of an elongated shaft that defines an axis, and the other is a coupling end part member, either the shaft end section or a portion of the end part member having a generally cylindrical shape with an axial cylindrical cavity that accommodates an axial cylindrical portion of the other snugly fitted therewith, the end section and said portion defining together a cylindrical joining section of the two components. The forming unit comprises a forming coil device that defines a forming space which can accommodate said joining section and comprises a current generating unit that is associated with the forming coil device, for generating a current pulse within the forming coil unit thereby to yield a PMF sufficiently strong to yield joining the two parts of the joining section. The forming coil device is assembled from two or more coiled sections which are firmly attached to one another at attachment faces thereof, which can be disassembled to permit release of the so formed driveshaft end part.

The method for forming a driveshaft in accordance with the invention comprises: (a) providing a shaft, the shaft defining an axis, and a coupling end part member; either the shaft end section or a portion of the end part member having a generally cylindrical shape with an axial cylindrical cavity and the other having an axial cylindrical portion that can fit within said cavity, and fitting said cylindrical portion into said cavity to define together a joining section with an external cylindrical shape cavity can accommodate of the other snuggly fitted therewithin and defining together a cylindrical joining section of the two components; (b) fitting a forming coil device around said joining section, the forming coil device being assembled from two or more coil sections firmly attached to one another at attachment faces thereof and being associated with a current generating unit;

(c) generating an intense current pulse through said forming coil device to generate a pulsed magnetic force (PMF) sufficient for joining the two parts of the joining section; and (d) disassembling the forming coil device to free the so formed end section of the driveshaft. Steps (a) and (d) may either be performed simultaneously for the two ends of the shaft to simultaneously join two coupling end part members one to each end of the shaft Alternatively, these steps may be performed in sequence by first carrying out steps (a) to (d) for joining one coupling end part member to one end of the shaft and then repeating these steps for joining another coupling end part member to the other end of the shaft.

An apparatus for simultaneous forming of the two end parts of a driveshaft will comprise two forming assemblies. Where the apparatus comprises a single forming assembly, first one end will be formed, the shaft will then be reversed and the other end will then be formed.

In accordance with one embodiment of the invention, the forming coil is connected directly to a current discharge circuitry. In accordance with this embodiment, the coil device is comprised of two or more, typically three or more coil sections of which two are end section connected each to one pole of the current discharge circuitry. In the case of three coil sections, for example, two are such end sections and one is an interconnecting section. In accordance with one embodiment, a coil of this kind is formed from a dielectric, non-electrically conducting material with an inner layer made of an electrical material. The dielectric material there serves as a structured element. An example of such a material is epoxy glass. The conducting layer may be made of copper as well as any other suitable method substance. Typically, the conducting layer extends also to the attachment faces and serves as the electrical link between the different sections.

The different sections may be held together by a reinforcing structure, may be connected to one another by the use of screws and bolts and in general by any other suitable means.

In accordance with another embodiment, the forming coil device is an independent coil device being an inductive association with a primary coil which is in turn connected to a current discharge circuitry, whereby a current pulse discharged through the primary coil induces the generation of a forming current pulse within the forming coil. In accordance with the one preferred embodiment, a forming unit comprises a primary coil connected to a current discharge circuitry for generating an intense current pulse, and two or more inserts, each of which constitutes a section of a forming coil device accommodated within an opening defined by the primary coil, the opening being of a diameter sufficient to permit the coupling end part to pass therethrough, and defining in turn a forming space to accommodate said joining section; the inserts being made of or having at least outer, inner and radial faces being made of an electrically conducting layer and being attached to one another at attachment faces with an electrically insulating layer between them. The inserts, in accordance with this embodiment, are typically a trapezoidal cross-section with the broad base facing outwards and the narrow base facing inwards juxtaposing the joining section.

The method in accordance with the above preferred embodiment, comprises: fitting a forming coil device adjacent said joining section, the forming coil device comprises a primary coil connected to a current discharge circuitry for generating an intense current pulse, and two or more inserts, each of which constitutes a section of a forming coil device accommodated within an opening defined by the primary coil, the opening being of a diameter sufficient to permit the coupling end part to pass therethrough, and defining in turn a forming space to accommodate said joining section; the inserts being made of or having their external layer made of an electrically conducting layer and being attached to one another at attachment faces with an electrically insulating layer between them; generating an intense current pulse through said primary coil to induce a forming current in the inner face of the forming coil device to generate a pulsed magnetic force (PMF) sufficient for joining the two parts of the joining section; and disassembling said inserts and removing the primary coil by axially moving either the primary coil or the formed driveshaft end.

In accordance with one preferred embodiment, it was found that superior joining is achieved by the use of an auxiliary device which is temporarily fitted together with the end part member to yield together a body having axial symmetry.

After formation of the joins between the shaft and the end part member, the auxiliary device is removed.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2A is a partial longitudinal cross-section of an apparatus of the invention with a driveshaft to be formed therewith.

FIG. 2B is a view from the direction of arrow II in FIG. 2A.

DESCRIPTION OF THE PREFERRED EMBODIMENTS

Figure 1A:
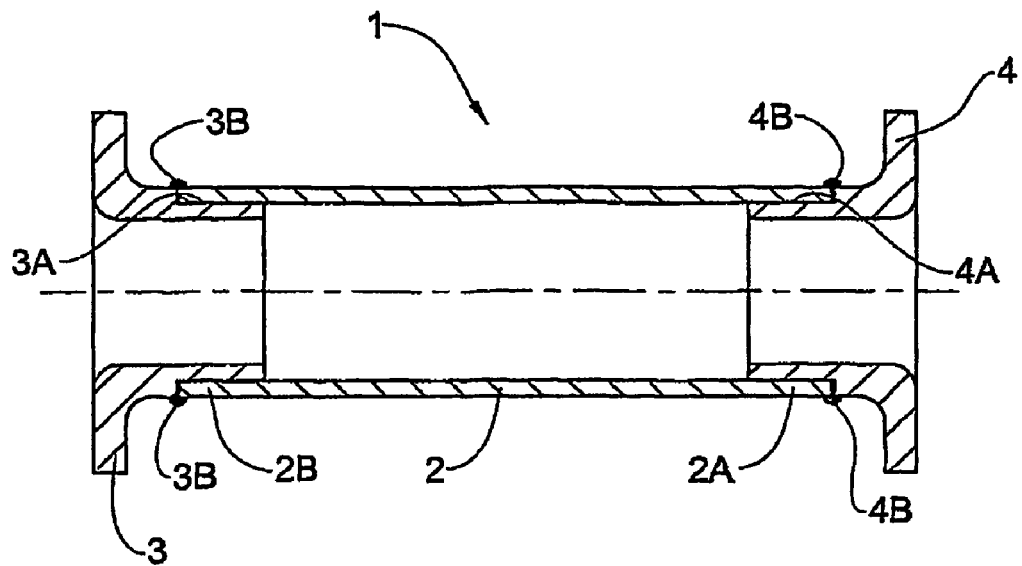
FIG. 1A is a schematic longitudinal section through a prior art vehicle driveshaft.

Reference is first being made to FIG. 1A, which shows a prior art driveshaft.

The driveshaft 1 consists of a tubular shaft 2 and two coupling end parts 3 and 4, one at each end of shaft 2. The two ends 2A and 2B of shaft 2 are sealed each in a respective recess 3A and 3B of end parts 3 and 4, respectively, and welded to it by conventional welds 3B and 4B, respectively.

Figure 1B:
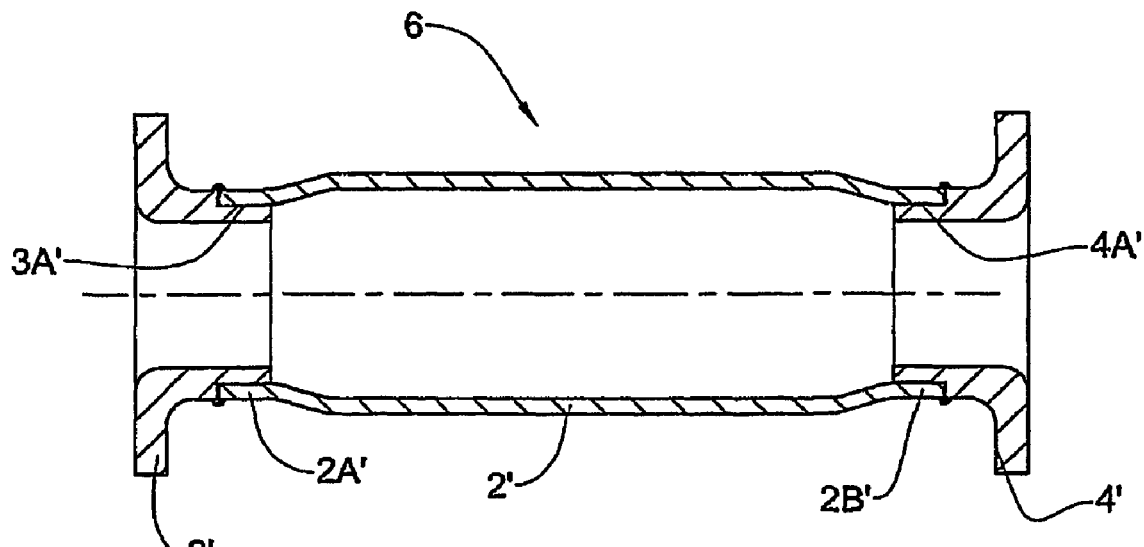
FIG. 1B is a longitudinal section of the vehicle driveshaft of the invention.

In distinction from prior art driveshafts, driveshaft 6 made in accordance with the invention, shown in FIG. 1B (where like elements were given the same reference numeral with a prime indication), is formed by welding the shaft 2' to the coupling end parts 3' and 4' by the use of a PMF process. The ends 2A' and 2B' are constricted and sealed in recesses 3A' and 4A', the constriction being achieved through a PMF process such as that will be described below. Through the PMF process ends 2A' and 2B' also become welded to respective recesses 3A' and 4A'.

As will also be appreciated, while the shaft shown herein is a tube, in other embodiments of the invention it may be a solid, elongate cylindrical mass.

Figure 1C:
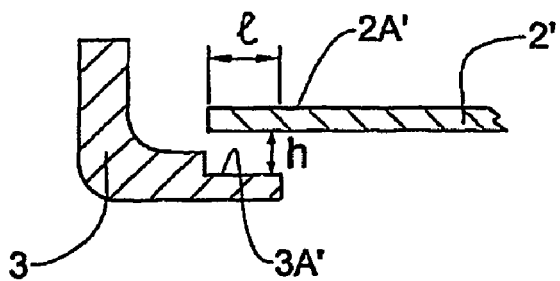
FIG. 1C shows the end section of the shaft overlapping the end recess of the end part prior to constriction to form the driveshaft of FIG. 1B.

FIG. 1C shows the end 2A' of shaft 2' overlapping the recess 3A' of end part 3' prior to PMF application. There is a gap between these two workpieces such that ratio of h as the length l of the overlapping portion typically meet the formula $h/l=0.1-0.5$.

FIGS. 2A and 2B show a forming coil device generally designated 8 accommodating a driveshaft pre-assembly consisting of an end part member 10 having flange portion 12 and an end section 11 of tubular shaft. The coil device 8 is a single wind coil formed by three coil sections 14A, 14B and 14C each of which is constituted from respective dielectric body 15A, 15B and 15C and with respective conducting layers 16A, 16B and 16C.

Layers 16A, 16B and 16C may typically be made of copper or any other high conductive material. The dielectric body 15A, 15B and 15C may, for example, be made of epoxy glass or any other suitable dielectric material which has the property of being able to resist strong and abrupt forces (the PMF process causes very strong radial forces on the forming coil). Each of the layers 16A, 16B and 16C extend over attachment faces 17 by which the different coil sections are attached to one another. This ensures electrical contact between the conducting layers in the different coil sections whereby all conducting layers constitute together a single wind coil. At their other end conducting layers 16A, 16B terminate in two respective protruding conductor sections 18A and 18B linked to a discharge circuit 19 consisting of a capacitor battery 20 and a switch 21. Bodies 15A, 15B and 15C may comprise respective cooling channels 21A, 21B and 21C having inlets and outlets, that is inlet 22 and outlet 23, respectively, and transfer of a cooling fluid (a gas or liquid) therethrough. The different coil sections may be held together by a variety of means such as for example an external holding structure or any other suitable fixing arrangement as may be known per se.

As can be readily appreciated, after joining of a tubular section 10 to the end section 11 of the shaft, the coil device is disassembled to free the formed driveshaft end section.

Figure 3A:
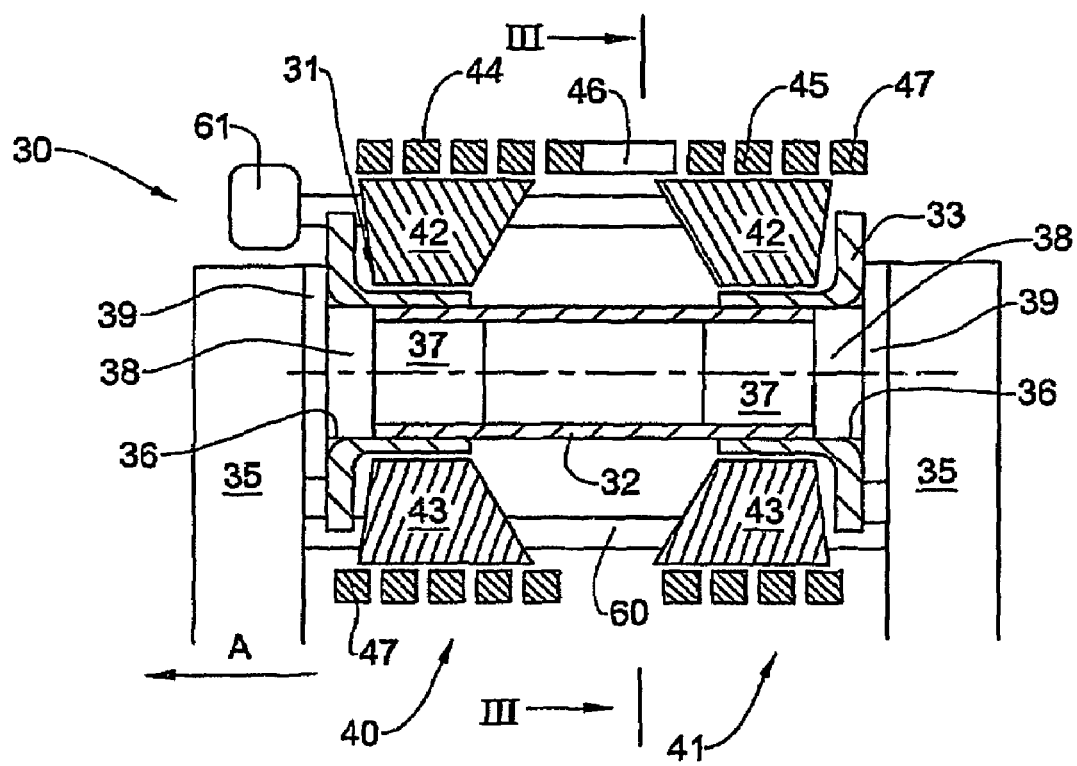
FIG. 3A is a schematic longitudinal cross-section of an apparatus in accordance with another embodiment of the invention with the driveshaft to be formed therewith.
Figure 3B:
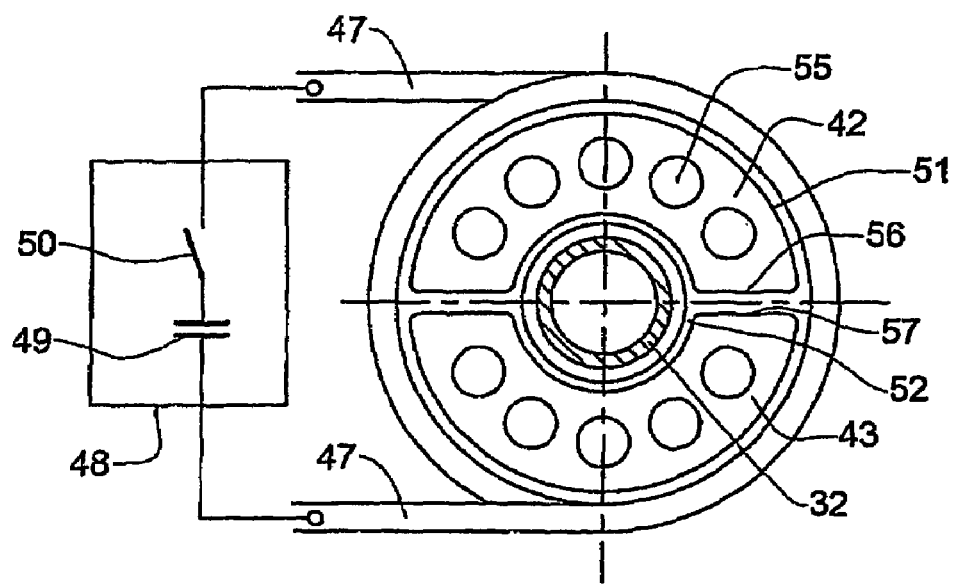
FIG. 3B is a cross-section through lines III-III in FIG. 3A.

Reference is now being made to FIGS. 3A and 3B showing an apparatus, generally designated 30, with a driveshaft pre-assembly 31 consisting of a shaft 32 and two end part members 33, one at each end of shaft 32. In the apparatus of this embodiment, the two end parts of the driveshaft are formed simultaneously.

Pre-assembly 31 is mounted between two holders 35 having a stepped protrusion 36 with an inner section 37 fitted within the lumen of shaft 32, an intermediate section 38 and an outer flange 39. In this way, the pre-assembly is firmly held in a firm pre-assembly arrangement.

The apparatus comprises two forming assemblies 40 and 41 each including a multi-wind primary coil 44 and 45, respectively, which are interconnected by a lead 46 and linked at their respective ends 47 to a current discharge circuitry 48 including a capacitor battery 49 and a switch 50. The primary coils 44 and 45 are coaxial with shaft 32. Two crescent shaped field shapers 42 and 43 are fitted within the space defined by the primary coils 44,45 and constitute together a forming coil device 51 also coaxially with the shaft 32. The two field shapers 42 and 43 define together a forming space 52 fitted around the portions of the pre-assembly which are to be joined to one another. Holes 55 may be formed in the field shaper sections 42,43 for both cooling and current concentration. The ends 56 and 57 are insulated to avoid electric contact between the two inserts.

In operation, a very short and intense electric pulse is actuated by the discharge circuitry 48 which then passes through primary coils 44,45 inducing an oppositely directed current in field shapers 42 and 43 and this current circulating in each of the field shapers causes a magnetic repulsion between the field shapers and the pre-assembly portions contained within the forming space thereby causing the two to pressure join, and with higher energies to surface weld, to one another. In this embodiment, both joins are formed simultaneously. It is appreciated that it is possible, in accordance with other embodiments, to separate the primary coils 44 and 45 and provide each with an independent current discharge circuitry having each an independent ignition arrangement. Alternatively, coils 44 and 45 may also be in a parallel electrical conductor (i.e. both to the same discharge circuitry).

In the specific embodiments of the apparatus shown in FIGS. 3A and 3B, field shapers 43 are fixed onto a pole 60 while field shapers 42 are linked to an opening mechanism 61. At the end of the operation, primary coils 44 and 45 can be moved axially to permit removal of field shapers 42. After such removal, the so formed driveshaft may be removed.

When the coupling end part member has a significant axial asymmetry close to the portion which is to be joined or welded, for example, a fork-shaped end part as is typically the case with driveshafts end parts, the electromagnetic field generated by the PMF process, may become irregular near the asymmetrical end piece portion, which may cause non-uniformity of the joins. In order to overcome this problem, an auxiliary device may be used, aimed at temporal restoring the axial symmetry of the coupling end part member. The insert is preferably produced from a material similar in electromagnetic properties to the coupling end part member.

Figure 4:
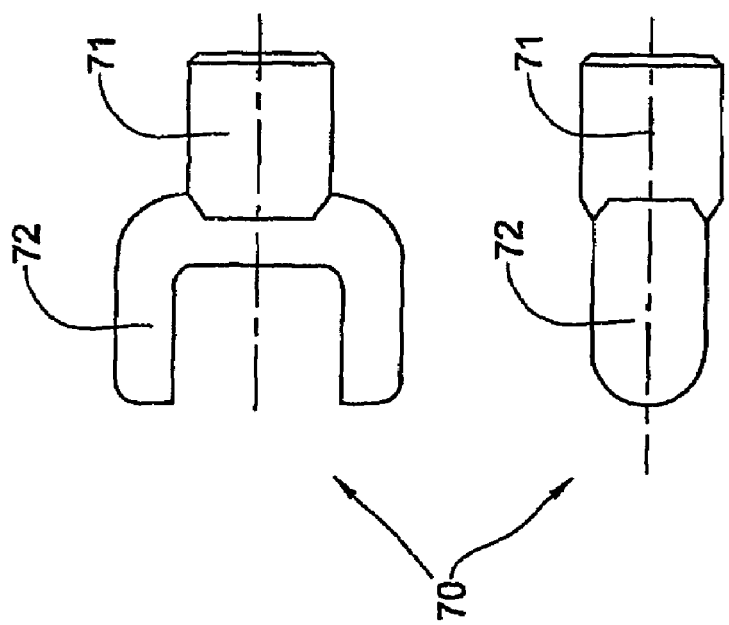
FIG. 4 shows a typical fork-shaped driveshaft end piece.

FIG. 4 shows a typical driveshaft coupling end part member which consists of a cylindrical joining portion 71 and a fork connector portion 72.

Figure 5:
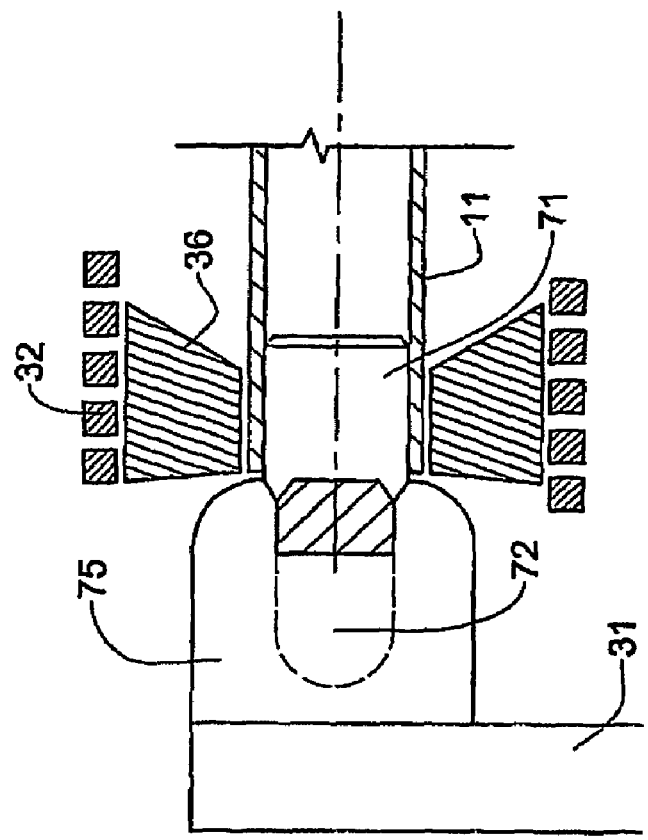
FIG. 5 is a partial view of an apparatus of the invention adapted for joining an end piece of FIG. 4.

In FIG. 5 the axial asymmetry of fork 70 is compensated for by the use of an auxiliary device 75, which in this case constitutes an integral part of the holder 31.

When the pre-assembly is fixed on holder 31, the fork 72 combines with the auxiliary device 75 to induce a combined body with an axial symmetry. When the driveshaft is unloaded from the apparatus, the auxiliary device stays connected to a holder 31.

Figure 6:
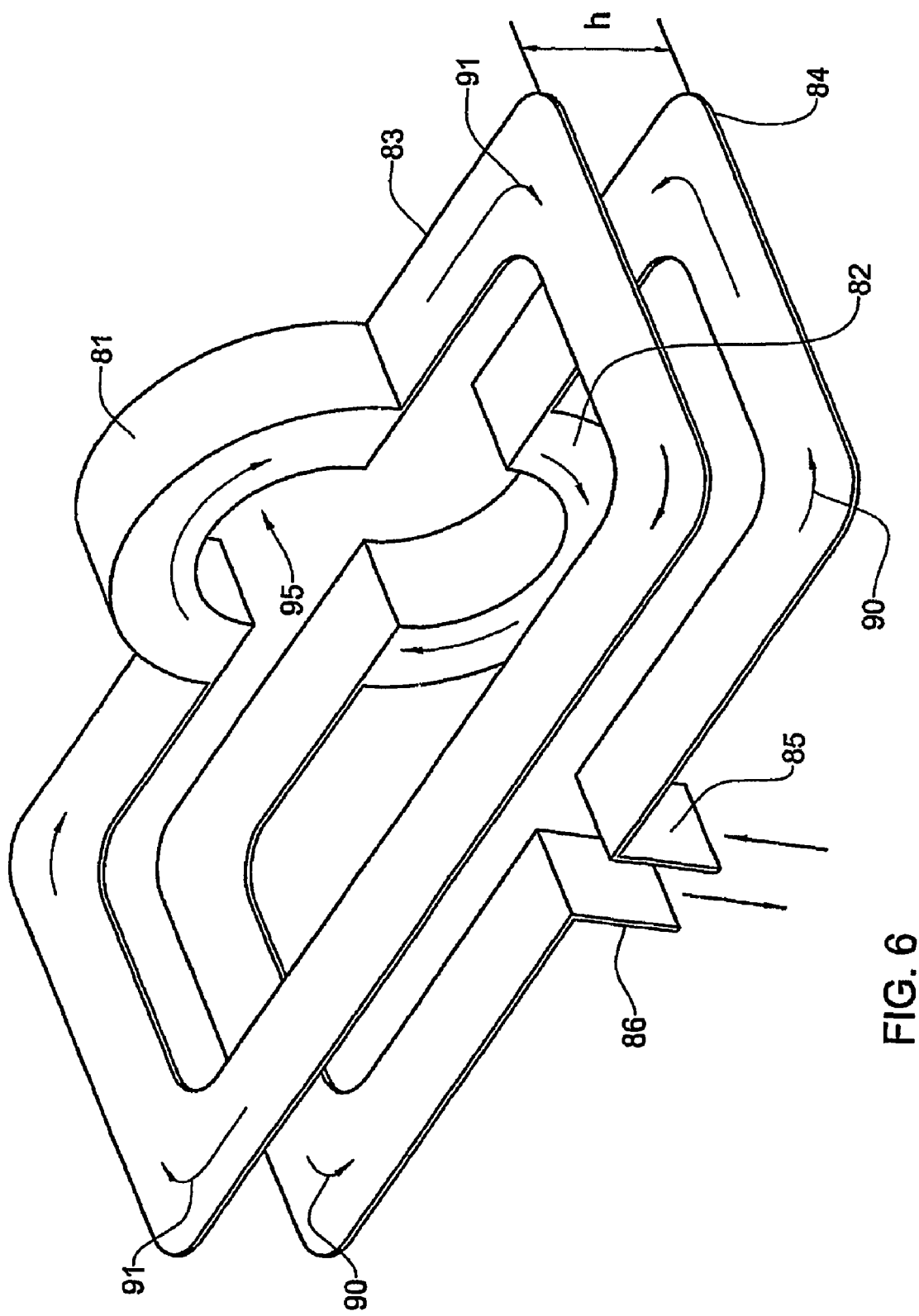
FIG. 6 shows a coil device structure in accordance with another embodiment of the invention.

A coil assembly useful in an apparatus in accordance with another embodiment of the invention is shown in FIG. 6. Two forming coil members 81 and 82, form part of structures 83 and 84, respectively, shown herein in an exploded view but which in use are placed proximal to one another with a distance between them of about 2 mm or less.

Structure 83 is a closed loop conductor constituted by a planar conductive strip, but for coil member portion 81. Structure 84 is constituted from a similar planar conductive strip, ending, however, at open ends 85 and 86 connected to a discharge circuitry (not shown).

In use, when current is discharged through conductor structure 84, current progresses along arrows 90 and this causes a counter current in the direction of arrows 91 in conductor structure 83. This yields an overall circular current around forming space 95 defined by two coiled sections 81 and 82. Placed in this forming space 95, is the portion to be joined of the driveshaft pre-assembly with the coupling end part facing towards the interior of conductor structures 83 and 84.

Figure 7:
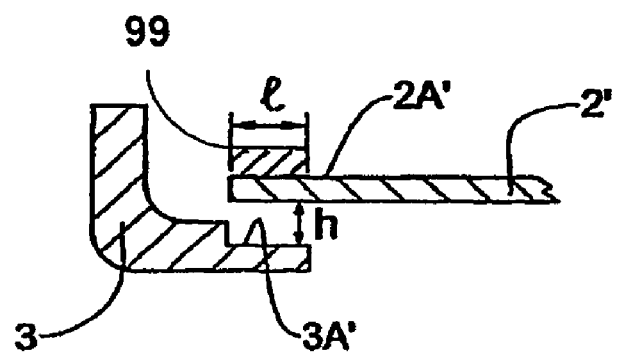
FIG. 7 is a view similar to FIG. 1C illustrating use of an intermediate driver element according to a further feature of the present invention.
Figure 8:
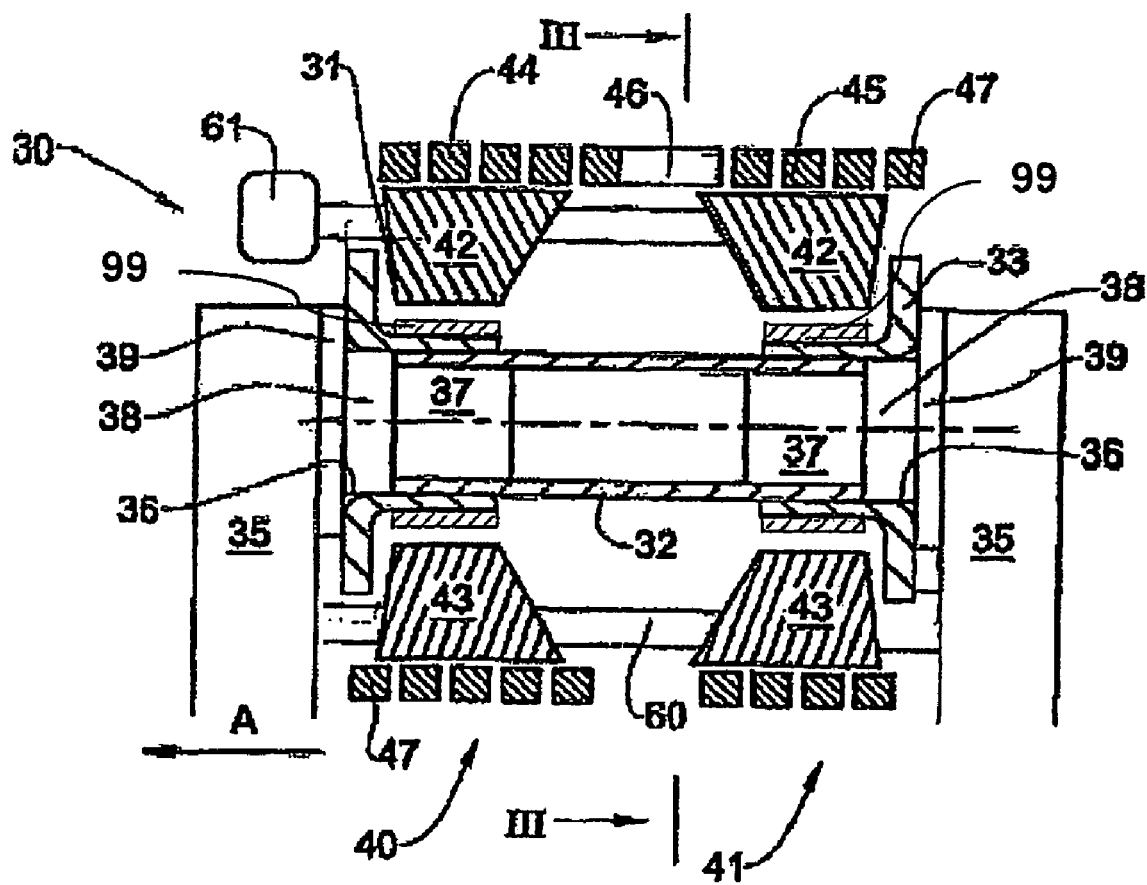
FIG. 8 is a view similar to FIG. 3A illustrating use of an intermediate driver element according to a further feature of the present invention.

Turning finally to FIGS. 7 and 8, since the technique of PMF forming is based upon induced electric eddy currents within the workpiece, the energy efficiency of the technique is much lower for metals having relatively poor electrical conductivity (such as Steel, Titanium and Nickel alloys) than for those with high conductivity. In order to improve the efficiency of the technique, certain implementations of the present invention employ a driver element, formed from metal with a higher electrical conductivity than the workpieces, deployed around at least part of the joining region. The presence of this driver element reduces the energy required for a given welding effect. This feature will now be illustrated with reference to FIGS. 7 and 8.

FIGS. 7 and 8 are generally similar to FIGS. 1C and 3A, respectively, and employ the same reference numerals for equivalent elements. As seen in FIG. 7, the workpiece is here modified by addition of a driver element 99 deployed in close overlapping relation with at least part of the region of overlap of end 2A' and recess 3A'. Driver element 99 is formed from a metallic material with electrical conductivity higher than that of the recessed element, and most preferably, from a high-conductivity metallic alloy such as an Aluminum or Copper alloy. Driver element 99 preferably extends around the entire circumference of the cylindrical joining region, and most preferably also overlaps substantially the entire length l of the joining region. The element may be implemented as a solid metal collar, or may be flexible foil wrapped around the joining region. The total thickness of driver element 99 is preferably in the range from 0.3 mm to 2 mm, and its width (i.e., the dimension parallel to the axis of the shaft) is preferably in the range from 1 mm to 30 mm. After welding, driver element 99 may remain as part of the joined structure, or may be removed (e.g., peeled off) by any suitable mechanical or other technique.

FIG. 8 shows a forming device similar to that of FIG. 3A, with equivalent elements labeled similarly. In this case, field shapers 42 and 43 have been modified to allow space of driver element 99. In all other respects, the structure and operation of the device of FIG. 8 is essentially the same as that of FIG. 3A described above.

It will be appreciated that the above descriptions are intended only to serve as examples, and that many other embodiments are possible within the scope of the present invention as defined in the appended claims.

What is claimed is:

1. An apparatus for forming a driveshaft having a shaft and a coupling end part of radial dimensions larger than those of the shaft, the apparatus comprising: one or two forming assemblies for forming one end or two ends of a driveshaft, respectively; the one or two forming assemblies comprising each a holder and a forming unit; the holder is adapted to receive and hold a driveshaft end part pre-assembly; the pre-assembly consisting of two components, of which one is an end section of an elongated shaft that defines an axis, and the other is a coupling end part member, either the shaft end section or a portion of the end part member having a generally cylindrical shape with an axial cylindrical cavity that accommodates an axial cylindrical portion of the other snugly fitted therewithin, the end section and said portion defining together a cylindrical joining section of the two components; the forming unit comprising a forming coil device defining a forming space for accommodating said joining section and a current generating unit for generating a current pulse within the forming coil unit to yield a pulsed magnetic force (PMF) sufficiently strong to yield joining of the two parts of the joining section; the forming coil device being assembled from two or more coil sections attached to one another at attachment faces thereof, which can be disassembled to permit release of the so formed driveshaft end part, wherein said current pulse is delivered only through an unbroken conductor, and wherein at least one of said coil sections of said forming coil device contributes to said PMF through inductively generated current.

2. An apparatus according to claim 1, comprising two forming assemblies for essential simultaneous forming of the two ends of the driveshaft.

3. An apparatus according to claim 1, wherein the forming coil device is in an inductive association with a primary coil connected to a current discharge circuitry such that a current pulse discharged through the primary coil induces the generation of a forming current pulse within the forming coil.

4. An apparatus according to claim 1, comprising two forming assemblies each of which has an independent current generating unit.

5. An apparatus according to claim 1, comprising two forming assemblies having current generating units that are linked to one another for simultaneous current discharge in both forming assemblies.

6. An apparatus for forming a driveshaft having a shaft and a coupling end part of radial dimensions larger than those of the shaft, the apparatus comprising: one or two forming assemblies for forming one end or two ends of a driveshaft, respectively; the one or two forming assemblies comprising each a holder and a forming unit; the holder is adapted to receive and hold a driveshaft end part pre-assembly; the pre-assembly consisting of two components, of which one is an end section of an elongated shaft that defines an axis, and the other is a coupling end part member, either the shaft end section or a portion of the end part member having a generally cylindrical shape with an axial cylindrical cavity that accommodates an axial cylindrical portion of the other snugly fitted therewithin, the end section and said portion defining together a cylindrical joining section of the two components; the forming unit comprising an unbroken primary coil connected to a current discharge circuitry for generating an intense current pulse, and two or more inserts, each of which constitutes a section of a forming coil device accommodated within an opening defined by the primary coil, the opening being of a diameter sufficient to permit the coupling end part to pass therethrough, and defining in turn a forming space to accommodate said joining section; the inserts being made of or having their external layer made of an electrically conducting layer and being attached to one another at attachment faces with an electrically insulating layer between them.

7. An apparatus according to claim 6, wherein the inserts have a trapezoidal cross-section with the broad base facing outwards and the narrow base facing inwards juxtaposing the joining section.

8. An apparatus according to claim 6, wherein the inserts have a plurality of axial bores.

9. An apparatus for forming a driveshaft having a shaft and a coupling end part, the apparatus comprising: one or two forming assemblies for forming one end or two ends of a driveshaft, respectively; the one or two forming assemblies comprising each a holder, a forming unit and an auxiliary device; the holder is adapted to receive and hold a driveshaft end part pre-assembly; the pre-assembly consisting of two components, of which one is an end section of an elongated shaft that defines an axis, and the other is a coupling end part member, either the shaft end section or a portion of the end part member having a generally cylindrical shape with an axial cylindrical cavity that accommodates an axial cylindrical portion of the other snuggly fitted therewithin, the end section and said portion defining together a cylindrical joining section of the two components; the forming unit comprising a forming coil device defining a forming space for accommodating said joining section and a current generating unit for generating an intense current pulse within the forming coil unit to yield a PMF sufficiently strong to yield joining of the two parts of the joining section; the forming coil device being assembled from two or more coil sections firmly attached to one another at attachment faces thereof, which can be disassembled to permit release of the so formed driveshaft end part; and the auxiliary device, being adapted for temporary assembly with the coupling end part member to yield together a body having axial symmetry.

10. An apparatus according to claim 9, wherein said auxiliary device is made of a material having essentially the same electromagnetic properties as those of said end part.

11. An apparatus according to claim 9, comprising two forming assemblies for essential simultaneous forming of the two ends of the driveshaft.

12. An apparatus according to claim 11, wherein each of the two forming assemblies has an independent current generating unit.

13. An apparatus according to claim 11, wherein the two forming assemblies have current generating units that are linked to one another for simultaneous current discharge in both forming assemblies.

14. A method for forming a driveshaft having a shaft and a coupling end part of radial dimensions larger than those of the shaft, the method comprising: (a) providing a shaft, the shaft defining an axis, and a coupling end part member; either the shaft end section or a portion of the end part member having a generally cylindrical shape with an axial cylindrical cavity and the other having an axial cylindrical portion that can fit within said cavity, and fitting said cylindrical portion into said cavity to define together a joining section with an external cylindrical shape; (b) fitting a forming coil device around said joining section, the forming coil device being assembled from two or more coil sections firmly attached to one another at attachment faces thereof and being associated with a current generating unit; (c) generating an intense current pulse through said forming coil device to generate a pulsed magnetic force (PMF) sufficient for joining the two parts of the joining section; and (d) disassembling the forming coil device to free the so formed end section of the driveshaft; steps (a)-(d) being performed either simultaneously for the two ends of the shaft to simultaneously join two coupling end part members one to each end of the shaft, or being performed in sequence by first carrying out steps (a)-(d) for joining one coupling end part member to one end of the shaft and then repeating these steps for joining another coupling end part member to the other end of the shaft, wherein said current generating unit delivers a current pulse only through an unbroken conductor, and wherein at least one of said coil sections of said forming coil device contributes to said PMF through inductively generated current.

15. A method according to claim 14, wherein the forming coil device is in an inductive association with a primary coil connected to a current discharge circuitry, and step (c) comprises discharging an intense current pulse through the primary coil, whereby a forming current pulse yielding a PMF is generated in said forming coil.

16. A method according to claim 14, further comprising providing a driver element closely deployed around said joining section, said driver element being formed from a metallic material having an electrical conductivity greater than an electrical conductivity of said shaft and said coupling end part member.

17. A method for forming a driveshaft having a shaft and a coupling end part of radial dimensions larger than those of the shaft, the method comprising: (a) providing a shaft, the shaft defining an axis, and a coupling end part member; either the shaft end section or a portion of the end part member having a generally cylindrical shape with an axial cylindrical cavity and the other having an axial cylindrical portion that can fit within said cavity, and fitting said cylindrical portion into said cavity to define together a joining section with an external cylindrical shape; (b) fitting a forming coil device adjacent said joining section, the forming coil device comprises an unbroken primary coil connected to a current discharge circuitry for generating an intense current pulse, and two or more inserts, each of which constitutes a section of a forming coil device accommodated within an opening defined by the primary coil, the opening being of a diameter sufficient to permit the coupling end part to pass therethrough, and defining in turn a forming space to accommodate said joining section; the inserts being made of or having their external layer made of an electrically conducting layer and being attached to one another at attachment faces with an electrically insulating layer between them; (c) generating an intense current pulse through said primary coil to induce a forming current in the inner face of the forming coil device to generate a pulsed magnetic force (PMF) sufficient for joining the two parts of the joining section; and (d) disassembling said inserts and removing the primary coil by axially moving either the primary coil or the formed driveshaft end; steps (a)-(d) being performed either simultaneously for the two ends of the shaft to simultaneously join two coupling end part members one to each end of the shaft, or being performed in sequence by first carrying out steps (a)-(d) for joining one coupling end part member to one end of the shaft and then repeating these steps for joining another coupling end part member to the other end of the shaft.

18. A method according to claim 17, further comprising providing a driver element closely deployed around said joining section, said driver element being formed from a metallic material having an electrical conductivity greater than an electrical conductivity of said shaft and said coupling end part member.

19. A method for forming a driveshaft having a shaft and a coupling end part of radial dimensions larger than those of the shaft, the method comprises: (a) providing a shaft, the shaft defining an axis, and a coupling end part member; either the shaft end section or a portion of the end part member having a generally cylindrical shape with an axial cylindrical cavity and the other having an axial cylindrical portion that can fit within said cavity, and fitting said cylindrical portion into said cavity to define together a joining section with an external cylindrical shape; (b) fitting a forming coil device around said joining section, the forming coil device being assembled from two or more coil sections firmly attached to one another at attachment faces thereof and being associated with a current generating unit; (c) temporarily fitting an auxiliary device to said coupling end part member to form together a body having an axial symmetry; (d) generating an intense current pulse through said forming coil device to generate a pulsed magnetic force (PMF) sufficient for joining the two parts of the joining section; and (e) removing the auxiliary device from the coupling end part and disassembling the forming coil device to free the so formed end section of the driveshaft; steps (a)-(e) being performed either simultaneously for the two ends of the shaft to simultaneously join two coupling end part members one to each end of the shaft, or being performed in sequence by first carrying out steps (a)-(e) for joining one coupling end part member to one end of the shaft and then repeating these steps for joining another coupling end part member to the other end of the shaft.

20. A method according to claim 19, wherein the auxiliary device is made of a material having essentially the same electromagnetic properties as those of said end part.

21. A method according to claim 19, further comprising providing a driver element closely deployed around said joining section, said driver element being formed from a metallic material having an electrical conductivity greater than an electrical conductivity of said shaft and said coupling end part member.

* * * * *